L. & A. GOODMAN.
STAPLING MACHINE.
APPLICATION FILED OCT. 15, 1913.

1,125,305.

Patented Jan. 19, 1915.
4 SHEETS—SHEET 1.

WITNESSES:
Clarence M. Smith
J. B. Webster

INVENTORS
Louis Goodman
Anne Goodman
BY
ATTORNEYS.

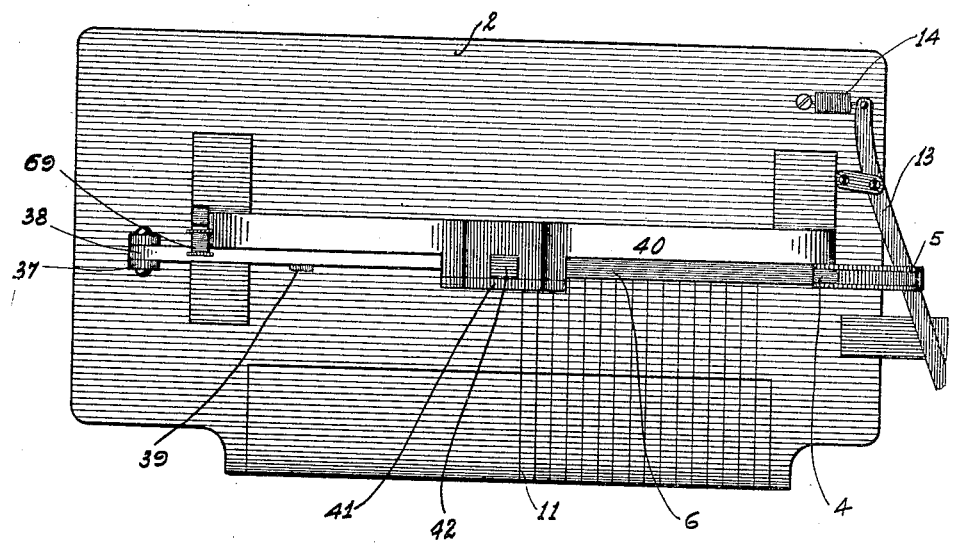
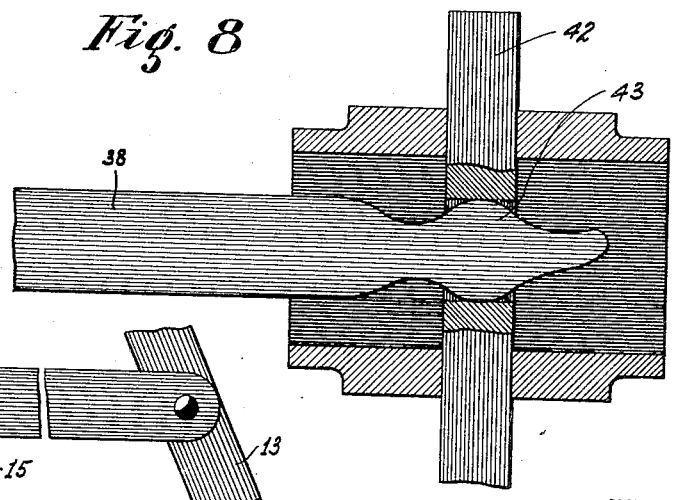
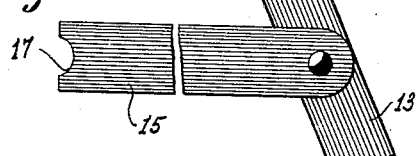

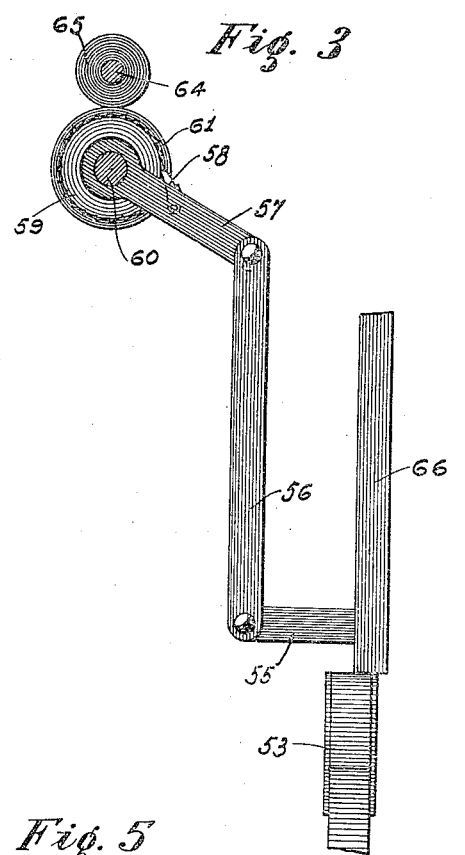
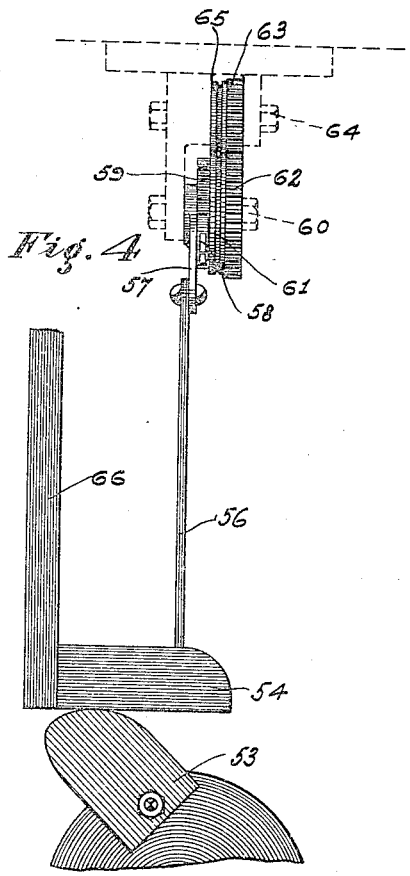
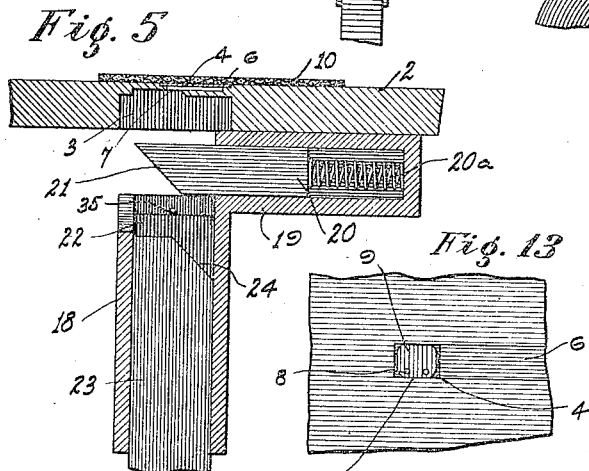
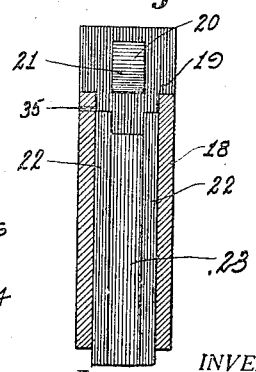
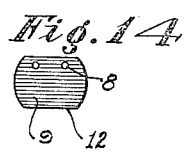

L. &. A. GOODMAN.
STAPLING MACHINE.
APPLICATION FILED OCT. 15, 1913.

1,125,305.

Patented Jan. 19, 1915.
4 SHEETS—SHEET 4.

WITNESSES:
Clarence M. Smith
J. B. Webster

INVENTORS
Louis Goodman
Anne Goodman
BY
ATTORNEYS.

UNITED STATES PATENT OFFICE.

LOUIS GOODMAN AND ANNE GOODMAN, OF STOCKTON, CALIFORNIA.

STAPLING-MACHINE.

1,125,305. Specification of Letters Patent. Patented Jan. 19, 1915.

Application filed October 15, 1913. Serial No. 795,234.

*To all whom it may concern:*

Be it known that we, LOUIS GOODMAN and ANNE GOODMAN, citizens of the United States, residing at Stockton, in the county of San Joaquin, State of California, have invented certain new and useful Improvements in Stapling-Machines; and we do declare the following to be a clear, full, and exact description of the same, such as will enable others skilled in the art to which it appertains to make and use the same, reference being had to the accompanying drawings and to the characters of reference marked thereon, which form a part of this application.

This invention relates to improvements in stapling machines used for stapling of all kinds, the present invention being particularly designed for use in connection with the stapling of metallic disks to fabric or other material adapted to be used in protective linings for pneumatic tires.

The object of the invention is to produce a machine by which the stapling operation may be performed in a rapid and efficient manner and also one in which the staples may be cut, bent and positioned all in one automatic operation.

A further object of the invention is to produce a simple and inexpensive device and yet one which will be exceedingly effective for the purposes for which it is designed.

These objects, we accomplish by means of such structure and relative arrangement of the parts as will fully appear by a perusal of the following specification and claims.

On the drawings similar characters of reference indicate corresponding parts in the several views.

Figure 1:
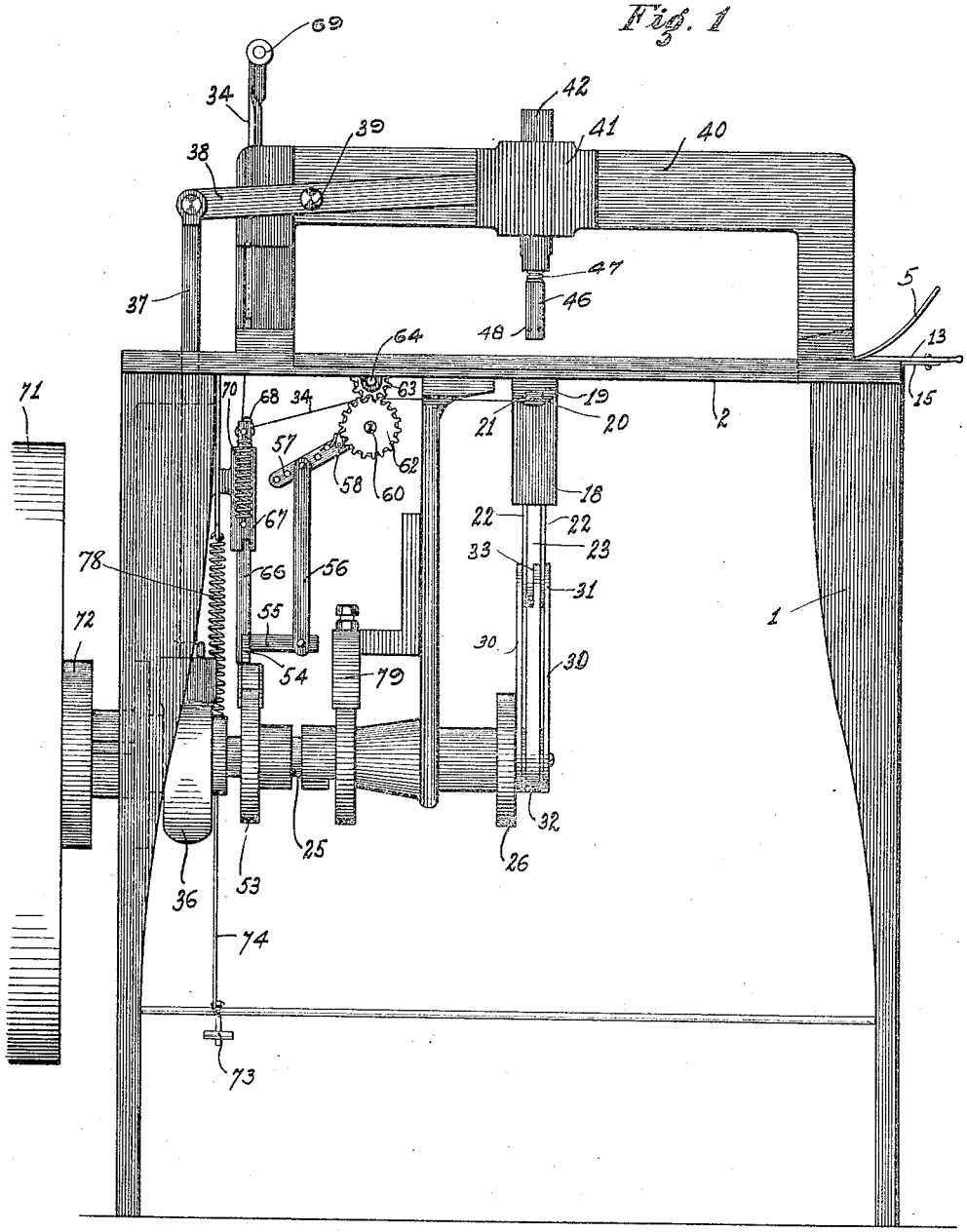
Figure 9:
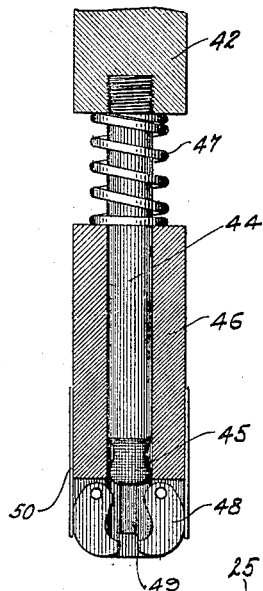
Figure 7:
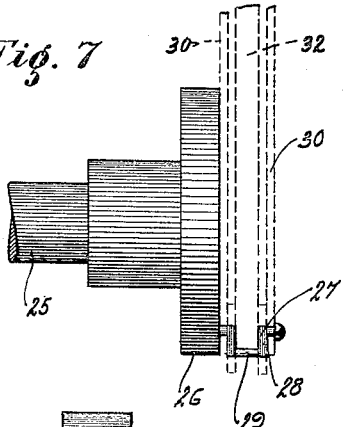
Figure 10:
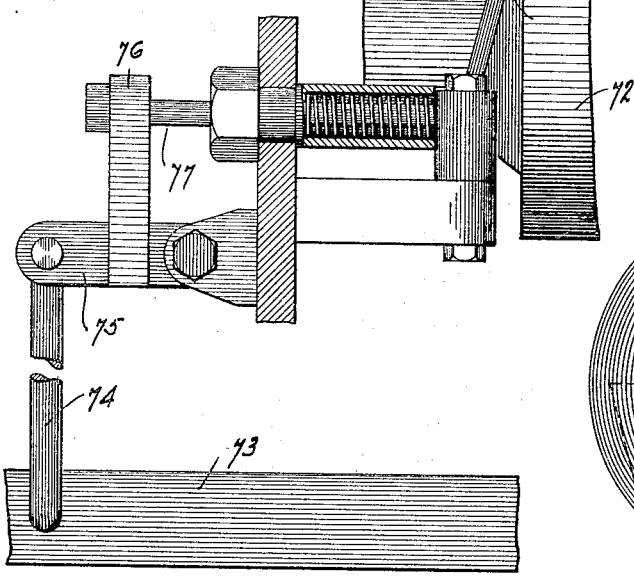
Figure 11:
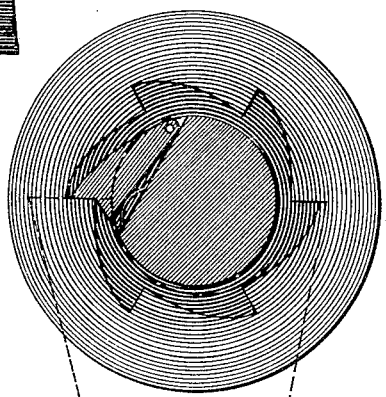

Figure 1 is a side elevation of the complete machine. Fig. 2 is a top plan view of the same. Fig. 3 is a fragmentary side view of the wire feeding mechanism. Fig. 4 is a front elevation of the same subject matter shown in Fig. 3. Fig. 5 is a fragmentary view in section of the staple forming and positioning mechanism. Fig. 6 is a front elevation of the subject matter shown in Fig. 5. Fig. 7 is a detached view showing the operating mechanism for the structure shown in Figs. 5 and 6. Fig. 8 is a detached view in section of the punch operating lever of the device. Fig. 9 is a detached view in section of the fastening punch mechanism. Fig. 10 is a detached view of the clutch mechanism of the device. Fig. 11 is a sectional view showing the clutch engaging and releasing mechanism. Fig. 12 is a detailed fragmentary view of a disk advancing lever. Fig. 13 is a fragmentary view of the operating platform showing the position of the disk prior to its being stapled to the fabric. Fig. 14 is a top plan view of one of the disks especially adapted for use in the particular type of machine here shown.

Referring now more particularly to the characters of reference on the drawings, the numeral 1 designates the supporting legs of any desired type carrying at their upper ends a platform 2. The platform 2 is provided on its underside with a recess 3. Such platform is also provided in its top surface with a slot 4 communicating at the outer edge of the platform 2 with a delivery chute 5. This slot is partly covered for a portion of its length by a top plate 6, but is uncovered directly over the recess 3. Said slot 4 also has its underside partly opening into the recess 3 as at 7, whereby the staples may be driven through said opening 7 and through the holes 8 in the disks 9 when the same are positioned over the recess 3. the fabric 10 being laid on top of the platform 2 over the opening in the slot 4 whereby the disks may be stapled to the fabric. At this point it might be well to state that the platform 2 is provided with a plurality of equally spaced lines 11 to designate the distance the fabric is to be moved each time in order to make way for the fastening of the next succeeding disk.

The disks 9 are rounded on two sides and are squared as at 12 on the other two sides whereby they can be fed into the chute 5 in such a fixed position as will permit them to be carried down said chute and into the slot 4 with the holes 8 so fixed as to at all times come directly over the opening 7 as such disks are advanced through the slot 4. This advancing of the disks is accomplished as follows, namely: A lever 13 is fulcrumed on the top of the platform 2 and has a spring 14 to hold it in normal position. This lever is provided with a finger member 15 having a jaw 17 shaped to receive one of the disks 9, which finger member 15 projects into the slot 4. As fast as a disk is stapled to the fabric another disk is brought into the chute 5 and the lever 13 is then operated to drive the disks through the slot 4 to bring another one over the opening 7 and then the spring 14 pulls the lever 13 to normal position and the disk in the chute 5 then drops into the slot 4 ready for further operation.

The above description sets forth in detail the method of positioning the disk each time over the opening 7 and such disk is then stapled to the fabric 10 by means of the following structure and operation, namely: The numeral 18 designates a slotted guide disposed immediately below the recess 3 and having a slotted housing 19 secured to the platform 2. In the housing 19 is slidably mounted a spring pressed block 20 having a beveled outer end 21. This block 20 is slidable transversely across the top of the guide 18. Movable vertically within the guide 18 are two blades 22 spaced apart and adapted to move on each side of the block 20. Movable vertically between the blades 22 is another blade or bar 23 having a beveled upper end 24 adapted to engage the beveled end 21 of the block 20 to move said block out of its path and back into the housing 19 and compress the spring 20$^a$ of said block 20. The numeral 25 designates the main operating shaft of the device which on its outer end is provided with a wheel 26 secured near the outer periphery of which is a crank comprising the crank shaft 27, the webs 28 and the crank pin 29. Journaled on the shaft 27 are a pair of spaced bars 30 flexibly connected with the blades 22 as at 31 and journaled on the pin 29 is a bar 32 flexibly connected with the bar 23 as at 33. The blades 22 and the bar 23 being of the same length, it can readily be seen that due to their connection, above described, with the crank, when the wheel 26 revolves, the blades 22 will first pass upwardly ahead of the bar 23 and on each side of the block 20. Then the bar 23 will follow and engage the block 20 moving it backwardly into the housing 19. This operation is used to form the staple and drive it through the holes 8 in the disk 9 in the following manner, namely: A wire 34 projects through the hole 35 in the guide 18 and is advanced across said guide in the path of the blades 22 and 23 by a suitable means hereinafter described. Then when it is so placed across the guide 18, the members 22 advance against it and since such wire is held taut, the sheering strain of the wire against the side of the guide 18 causes the blades 22 to break off a piece and drive the free ends thereof upwardly along the sides of the block 20. Then when this is done, the member 23 advances and the beveled edge 24 pushes the beveled edge 21 on the block 20 and moves it backwardly away from the staple thus formed and then the bar 23 continues to move upwardly driving the free ends of the staple through the holes 8 in the disk 9. We then provide a means for bending said free ends to fasten the staple, which structure and the operation thereof is as follows, namely: On the shaft 25 is an eccentric 36 operating a rod 37 to drive a lever 38 fulcrumed at 39 on a cross frame 40 held upwardly from the platform 2. The numeral 41 designates a boxing secured through the member 40 and movable through which is a punching rod 42 into which the lever 38 projects as at 43. Said lever has a curved end at this point to permit of the necessary lateral motion through the member 42 as it is moved up and down.

On the lower end of the member 42 is a pin 44 having a curved knob 45 on its lower end. Slidable over the pin 44 is a sleeve 46 secured to the member 42 by means of an expansive spring 47 which holds the sleeve 46 normally away from the member 42. Pivotally mounted in the lower end of the sleeve 46 is a pair of spaced cams 48 and the numeral 49 designates a pin normally projecting downwardly from the knob 45 between said cams 48.

When the staple has been formed and projected through the disk and fabric in the manner set forth above, then the member 42 is moved downwardly and the cams 48 which have curved ends as shown engage the free ends of the staple and since such cams 48 are spring controlled by means of the springs 50, this operation bends the free ends of such staple slightly toward each other. When said ends have been bent, the sleeve 46 has by that time engaged the platform 2 and then the further movement of the member 42 drives the pin 49 downwardly causing the knob 45 to engage the upper curved ends of the cams 48 and move them out of the way. The pin 49 then strikes the free ends of the staple and drives them downwardly and clamps them into fixed position against the fabric and the staple forming and clamping function is then completed. Then all of the parts move to normal position again and the wire 34 is then advanced across the guide member 18 by means of the following structure and operation, namely: With the revolution of the shaft 25 a cam 53 engages a bar 54 connected with which is an outwardly projecting arm 55, pivotally connected with which cam 55 is a link 56 pivotally connected at its upper end with a lever 57 having a pawl 58 which engages a ratchet wheel 59 turnable on a pin 60, there being a grooved wheel 61 secured to the ratchet wheel 59 and a pinion 62 secured to the wheel 61. This pinion 62 engages another pinion 63 turnable on a pin 64 and secured to which is a grooved wheel 65 in edge to edge contact with the wheel 61, the wire 34 projecting between these grooved wheels 61 and 65. Then when the cam 53 engages the bar 54 it moves said bar and said members 55 and 56 upwardly causing the lever 57 to be operated to cause the ratchet 58 to move the wheel 59 and incidentally the wheels 61 and 65 causing the wire 34 to be advanced, such wire having been previously loosened ready for said advancement by means of the following structure, namely: Secured to the bar 54 is an upwardly projecting rod 66 movable through a guide 67 and having on its upper end a small pulley 68 under which the wire 34 passes from its supply spool 69. The member 66 is provided at its upper end with a spring 70, which spring is connected at its other end to the guide 67. After the said member 66 is moved upwardly releasing the wire 34 from its taut position, and thus permitting it to be advanced as described, the cam 53 then moves downwardly, and the spring 70 pulls the member 66 downwardly again thus pulling the wire 34 taut and withdrawing another portion of the same from the spool 69. The wheels 61 and 65 of course hold the wire at its outer end in frictional contact so that it will not pull backwardly from that point with the operation of the spring 70.

The above description sets forth in detail the operation of the advancing of the wire, the cutting and forming of the staple, the driving of the staple in position and the fastening of the same in position. As has been described, this is all done with the operation of the shaft 25 and this shaft 25 may be operated continuously or intermittently for each staple to be fastened by means of the following structure, namely: The numeral 71 designates the main driving pulley to which the power may be applied and an intermediate clutch 72 may be interposed between this pulley 71 and the shaft 25 and this clutch may be held normally out of engagement when the machine is not to be operated and thrown into engagement each time the machine is to be operated by means of a foot pedal 73. The said clutch 72 is held normally out of engagement with the pulley 71 by any suitable spring structure and then when the pedal 73 is pulled downwardly this pulls on a rod 74 which in turn pulls on a lever 75 causing an arm 76 to pull on a rod 77 which moves a clutch 72 in such position as to cause it to engage the pulley 71 thus causing the shaft 25 to be revolved. Then when the foot is released from the member 73 a spring 78 pulls all the parts back into normal position causing the shaft 25 to be disengaged from the pulley 71 and a friction band brake 79 then brings the shaft 25 to a stop. Of course any type of clutch can be used for the purpose and hence we make no specific claim to any specific type thereof.

From the foregoing description it will readily be seen that we have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described our invention what we claim as new and useful and desire to secure by Letters Patent is:—

A device for stapling disks to fabric comprising a table having an opening and a slot communicating with said opening, a curved chute communicating with said slot, such chute being adapted to receive the disks and deliver the same into said slot, a spring controlled lever fulcrumed adjacent said table and having a finger member operable in said slot below the end of said chute to advance said disks through said slot to bring them over said opening, the retraction of said finger member leaving an opening for the reception of another disk from said curved chute, and means below said opening for forming staples and driving the same through said opening and said disks and means operable above said table to clench said staples, as described.

In testimony whereof we affix our signatures in presence of two witnesses.
        LOUIS GOODMAN.
        ANNE GOODMAN.
Witnesses:
  STEPHEN N. BLEWETT,
  VERADINE WARNER.

Copies of this patent may be obtained for five cents each, by addressing the "Commissioner of Patents, Washington, D. C."